(No Model.)

W. G. GASS & W. A. GALASHAN.
MECHANICAL MOVEMENT.

No. 273,509. Patented Mar. 6, 1883.

WITNESSES:
Alexander Barkoff
Harry Drury

INVENTOR:
William G. Gass
and
William A. Galashan
by their attys
Howson & Sons

UNITED STATES PATENT OFFICE.

WILLIAM G. GASS AND WILLIAM A. GALASHAN, OF PHILADELPHIA, PA.

MECHANICAL MOVEMENT.

SPECIFICATION forming part of Letters Patent No. 273,509, dated March 6, 1883.

Application filed January 19, 1883. (No model.)

*To all whom it may concern:*

Be it known that we, WILLIAM GEORGE GASS, a subject of the Queen of Great Britain and Ireland, and a resident of Philadelphia, Pennsylvania, and WILLIAM A. GALASHAN, a citizen of the United States, residing in Philadelphia, Pennsylvania, have invented a new Mechanical Movement, of which the following is a specification.

The object of our invention is to convert a uniform rotary motion into a differential rotary motion in such a manner that the speed of the differentially-rotated shaft will, during a portion of the revolution of said shaft, be gradually increased, and during the other portion of the revolution will be gradually decreased, both increase and decrease being uniform in character, and the changes being effected without jar.

Figure 1:
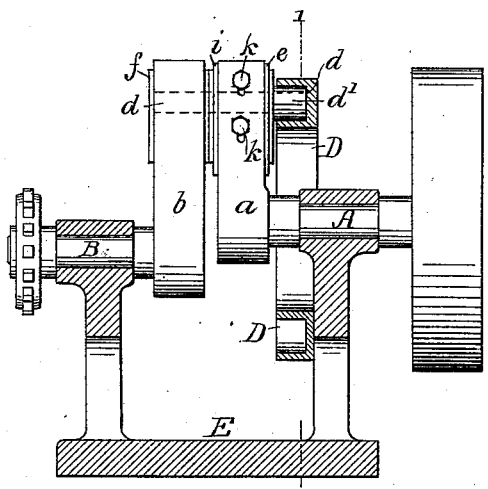
Figure 2:
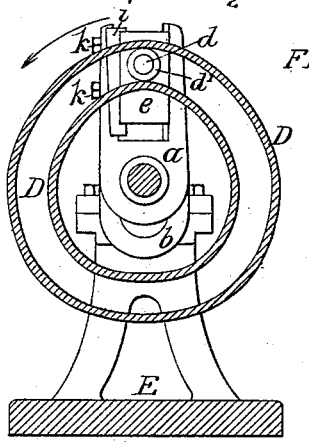
Figure 3:
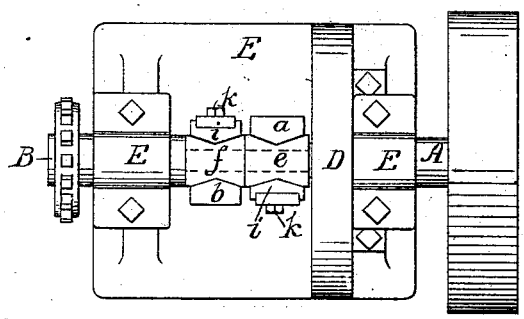

In the accompanying drawings, Figure 1 is a side view, partly in section, of the devices comprising our new mechanical movement; Fig. 2, a transverse section on the line 1 2, and Fig. 3 a plan view.

A is a shaft, to which a uniform rotating movement is imparted in any suitable manner, and B is a shaft to which a differential rotating movement has to be imparted from the shaft A, both shafts A and B being adapted to suitable bearings on a bracket or stand, E. The shaft A has a crank-arm, $a$, and the shaft B a similar crank-arm, $b$, both arms being slotted for the reception of sliding boxes $e$ and $f$, through which passes a pin, $d$, which may be suitably secured to one of the boxes to prevent longitudinal displacement. The shafts A and B are set out of line with each other—that is to say, they are in the same vertical plane; but the axis of the shaft B is somewhat below that of the shaft A.

A differential-motion apparatus has been heretofore devised in which are employed the two shafts set out of line and having crank-arms and a crank-pin common to both; but in such case the pin was secured to the crank-arm of one shaft and adapted to a slot in the crank-arm of the other shaft, the consequence of this arrangement being that the speed of the driven shaft is not gradually increased during one portion of the revolution of the shaft and then gradually decreased during the other portion of the revolution, and the device is impracticable for many purposes. This objection we overcome by making the crank-pin adjustable radially in respect to the driving-shaft, and by causing it to move from and toward said shaft as the latter revolves. This movement is effected by a cam, D, secured to the stand E, and having a slot for the reception of a roller, $d'$, on the projecting end of the crank-pin $d$, so that as the shaft A rotates the roller is caused to traverse the slot, the shape of the latter thus determining the position of the crank-pin in respect to the shaft A, so that by properly governing the radial movement of said pin the speed of the shaft B can be regulated as desired.

The boxes $e$ and $f$ are grooved to prevent lateral displacement, and in connection with each box we use a filling-block, $i$, interposed between the box and one of the wings of the slotted crank-arm, said wing being tapered or inclined on the inner edge, so that each block $i$ acts as a wedge, and by radially adjusting said blocks any looseness caused by wear of the boxes can be readily compensated for. To secure the blocks $i$ in position, set-screws $k$, passing through slots in the crank-arm, are employed.

In carrying out our invention the exact construction of parts shown need not be adhered to in all cases. For instance, the boxes $e$ and $f$ may be dispensed with and the crank-pin itself adapted to the slots of the crank-arms, and two cams, D, one behind each crank-arm, may be used, so as to act simultaneously on both ends of the crank-pin, and in some cases the latter may have pivoted sleeves adapted to slide on the crank-arms, the latter in such cases being simple rods without slots.

We claim as our invention—

1. The combination of the two shafts A and B, set out of line with each other, and each having a crank-arm with a crank-pin common to both arms, and a cam, D, for radially shifting said pin as the shafts rotate.

2. The combination of the shafts A B, set out of line, the slotted crank-arms $a$ $b$, the sliding blocks $e\,f$, pin $d$, and cam D, as set forth.

3. The combination of the shafts A B, set out of line, the slotted crank-arms $a\,b$, the sliding blocks $e\,f$, and the wedge-blocks $i$, as set forth.

In testimony whereof we have signed our names to this specification in the presence of two subscribing witnesses.

WILLIAM GEO. GASS.
WILLIAM A. GALASHAN.

Witnesses:
THOMAS DUGAN,
HARRY SMITH.